(12) United States Patent
Hirosawa et al.

(10) Patent No.: US 11,383,716 B2
(45) Date of Patent: Jul. 12, 2022

(54) VEHICLE CONTROL APPARATUS, VEHICLE, OPERATING METHOD OF VEHICLE CONTROL APPARATUS, AND STORAGE MEDIUM

(71) Applicant: HONDA MOTOR CO., LTD., Tokyo (JP)

(72) Inventors: Nozomu Hirosawa, Wako (JP); Daichi Kato, Wako (JP); Takuma Kobayashi, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/189,508

(22) Filed: Mar. 2, 2021

(65) Prior Publication Data

US 2021/0284164 A1    Sep. 16, 2021

(30) Foreign Application Priority Data

Mar. 16, 2020    (JP) .............................. JP2020-045499

(51) Int. Cl.
*B60W 30/18*    (2012.01)
*B60W 10/20*    (2006.01)
(Continued)

(52) U.S. Cl.
CPC ...... *B60W 30/18163* (2013.01); *B60W 10/04* (2013.01); *B60W 10/18* (2013.01);
(Continued)

(58) Field of Classification Search
CPC .......... B62D 6/00; B62D 1/00; G05D 1/0061; G05D 2201/0213; G05D 1/0088;
(Continued)

(56) References Cited

U.S. PATENT DOCUMENTS 10,202,123 B2   2/2019   Aoki
10,328,941 B2   6/2019   Fujii et al.
(Continued)

FOREIGN PATENT DOCUMENTS

JP    2017-138899 A    8/2017
JP    2018094960 A     6/2018
(Continued)

OTHER PUBLICATIONS

Japanese Office Action in related, co-pending application No. JP 2019540205, dated Jun. 4, 2021.
(Continued)

*Primary Examiner* — Jelani A Smith
*Assistant Examiner* — Paul A Castro
(74) *Attorney, Agent, or Firm* — Thomas | Horstemeyer, LLP (57) ABSTRACT

A vehicle control apparatus for controlling a vehicle based on peripheral information of the vehicle, the apparatus comprising: a control unit configured to control steering and acceleration/deceleration of the vehicle in a first state in which holding of a steering apparatus of the vehicle by a driver is required or a second state in which holding of the steering apparatus is not required, wherein the control unit transitions a state of the vehicle from the second state to the first state, if input of an intervention operation for acceleration/deceleration by the driver is detected in a case of executing course change of the vehicle, when the vehicle is traveling in the second state.

14 Claims, 3 Drawing Sheets

(51) Int. Cl.
*B60W 10/04* (2006.01)
*B60W 30/14* (2006.01)
*B60W 50/14* (2020.01)
*B60W 10/18* (2012.01)

(52) U.S. Cl.
CPC .......... *B60W 10/20* (2013.01); *B60W 30/143* (2013.01); *B60W 50/14* (2013.01)

(58) Field of Classification Search
CPC ........ G05D 1/021; G05D 1/02; G05D 1/0223; B60K 2370/175; B60K 2026/026; B60K 28/066; B60K 2370/178; B60W 50/14; B60W 60/0015; B60W 10/20; B60W 2540/10; B60W 2050/143; B60W 10/18; B60W 40/08; B60W 30/12; B60W 40/09; B60W 30/16; B60W 60/0053; B60W 30/0956; B60W 50/10; B60W 30/18163; B60W 50/08; B60W 2540/215; B60W 30/182; B60W 40/10; B60W 2040/0818; B60W 2510/20; B60W 2710/20; B60W 60/0059; B60W 2540/229; B60W 30/00; B60W 60/0051; B60W 60/0055; B60W 60/0054; B60W 50/087; B60W 2050/0072; B60W 2050/0096; B60W 2050/0095; B60W 2050/0043; B60W 60/0061

See application file for complete search history.

(56) References Cited

U.S. PATENT DOCUMENTS

| | | |
|---|---|---|
| 10,435,021 B2 | 10/2019 | Ibuka et al. |
| 2017/0225685 A1* | 8/2017 | Aoki ...................... B60Q 1/346 |
| 2017/0240177 A1* | 8/2017 | Fujii ............... B60W 30/18163 |
| 2021/0146943 A1 | 5/2021 | Oniwa et al. |

FOREIGN PATENT DOCUMENTS

| | | |
|---|---|---|
| JP | 6464107 B2 | 2/2019 |
| JP | 2019-036339 A | 3/2019 |
| JP | 2019-109666 A | 7/2019 |
| WO | 2018/220827 A1 | 12/2018 |
| WO | WO-2021106159 A1 * | 6/2021 |

OTHER PUBLICATIONS

Partial English translation of the Office Action dated Jun. 4, 2021, concerning Japanese Patent Application No. 2020-045499.

Japanese Office Action for Japanese Patent Application No. 2020-045499 dated Jun. 4, 2021 (partially translated).

Decision to Grant for Japanese Patent Application No. 2020-045499 dated Oct. 25, 2021 (partially translated).

* cited by examiner

VEHICLE CONTROL APPARATUS, VEHICLE, OPERATING METHOD OF VEHICLE CONTROL APPARATUS, AND STORAGE MEDIUM

CROSS-REFERENCE TO RELATED APPLICATION(S)

This application claims priority to and the benefit of Japanese Patent Application No. 2020-045499 filed on Mar. 16, 2020, the entire disclosure of which is incorporated herein by reference.

BACKGROUND OF THE INVENTION

Field of the Invention

The present invention relates to a vehicle control apparatus, a vehicle, an operating method of the vehicle control apparatus, and a storage medium.

Description of the Related Art

Japanese Patent No. 6464107 describes discontinuing execution of automatic lane change in the case where the accelerator pedal or the brake pedal is operated by an amount greater than or equal to a threshold value.

However, with the technology described in Japanese Patent No. 6464107, there is a problem in that the automatic lane change function may be canceled despite an occupant of the vehicle wanting to change lanes.

The present invention provides a technology for implementing vehicle control that takes safety into consideration, even in the case where an acceleration/deceleration intervention operation is performed.

SUMMARY OF THE INVENTION

According to one aspect of the present invention, there is provided a vehicle control apparatus for controlling a vehicle based on peripheral information of the vehicle, the apparatus comprising:
a control unit configured to control steering and acceleration/deceleration of the vehicle in a first state in which holding of a steering apparatus of the vehicle by a driver is required or a second state in which holding of the steering apparatus is not required,
wherein the control unit transitions a state of the vehicle from the second state to the first state, if input of an intervention operation for acceleration/deceleration by the driver is detected in a case of executing course change of the vehicle, when the vehicle is traveling in the second state.

DESCRIPTION OF THE EMBODIMENTS

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
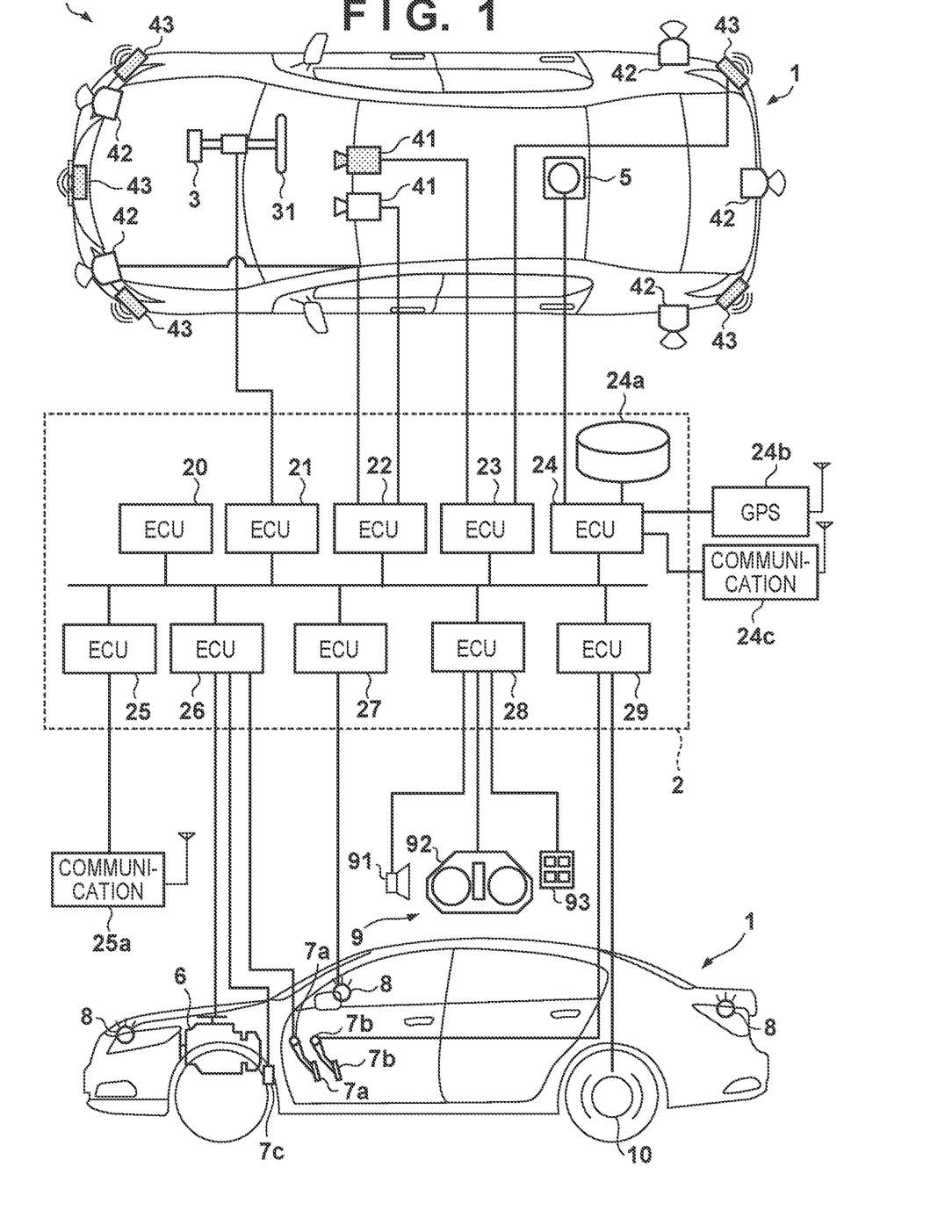
FIG. 1 is a block diagram of a vehicle and a vehicle control apparatus according to an embodiment.

FIG. 1 is a block diagram of a vehicle and a vehicle control apparatus according to one embodiment of the present invention. In FIG. 1, a vehicle 1 is schematically shown in plan view and side view. The vehicle 1 is, as an example, a sedan-type four-wheeled passenger car.

The vehicle control apparatus in FIG. 1 includes a control unit 2. The control unit 2 includes a plurality of ECUs 20 to 29 connected in a communicable manner by an in-vehicle network. The ECUs each include a processor that is typified by a CPU, a storage device such as a semiconductor memory, and an interface with an external device. The storage device stores programs that are executed by the processor, data that is used in processing by the processor, and so on. The ECUs may each be provided with a plurality of processors, storage devices, and interfaces.

Hereinafter, the functions for which the ECUs 20 to 29 are responsible will be described. Note that it is possible to set the number of ECUs and the functions for which the ECUs are responsible as appropriate, and for functions to be subdivided or integrated depending on the embodiment.

The ECU 20 executes control related to automated driving or driving assist of the vehicle 1. The ECU 20 automatically control at least one of steering and acceleration/deceleration of the vehicle 1, according to a driving mode. The driving mode is set in correspondence with so-called automated driving levels. For example, automated driving levels include level 0 (L0), level 1 (L1), level 2A (L2A), level 2B (L2B), level 3 (L3) and level 4 (L4).

The levels are defined as follows. Note that, in the following description, ACC means Adaptive Cruise Control, and LKAS means Lane Keeping Assist System.

L0: Driving assist is not substantively performed.

L1: One of ACC and LKAS of driving assist is executed.

L2A: Both ACC and LKAS of driving assist are executed, and the driver is required to hold a steering wheel 31.

L2B: Both ACC and LKAS of driving assist are executed, and the driver is not required to hold the steering wheel 31.

L3: The duty of the driver related to the driving operation is eased from L2B, and the peripheral monitoring duty by the driver will be unnecessary.

The degree of automation increases in order of L0, L1, L2A, L2B and L3, and, in the present embodiment, L2A will be referred to as a first state and L2B will be referred to as a second state. Note that, here, L0, L1, L2A, L2B and L3 are illustrated as automated driving levels, but there may be other levels (e.g., mode L4, etc. with a greater degree of driving assist than the mode L3).

The ECU 21 controls an electric power steering apparatus 3. The electric power steering apparatus 3 includes a mechanism for steering the front wheels according to a driving operation (steering operation) of the driver with respect to the steering wheel 31. Also, the electric power steering apparatus 3 includes a motor that exerts driving force for assisting the steering operation or automatically steering the front wheels, and a sensor that detects a steering angle. When the vehicle 1 is in an automated driving state, the ECU 21 automatically controls the electric power steering apparatus 3 in correspondence with instructions from the ECU 20, and controls the direction of travel of the vehicle 1.

The ECUs 22 and 23 control detection units 41 to 43 that detect the situation around the vehicle, and perform information processing on the detection results thereof. The detection unit 41 is a camera that shoots forward of the vehicle 1 (hereinafter also referred to as camera 41), and, in the case of the present embodiment, is attached to a vehicle interior side of a front window at a front portion of the roof of the vehicle 1. Through analysis of images shot by the camera 41, contour extraction of objects and extraction of lane divider lines (white lines, etc.) on the road is possible.

The detection unit 42 is a Light Detection and Ranging (LiDAR) sensor (hereinafter also referred to as LiDAR sensor 42), and detects objects around the vehicle 1 and measures the distance to objects. In the case of the present embodiment, five LiDAR sensors 42 are provided, with one being provided in each corner portion of the front portion, one in the middle of a rear portion, and one on each side of the rear portion. The detection unit 43 is a milliwave radar (hereinafter also referred to as radar 43), and detects objects around the vehicle 1 and measures the distance to objects. In the case of the present embodiment, five radars 43 are provided, with one being provided in the middle of the front portion of the vehicle 1, one being provided in each corner portion of the front portion, and one being provided in each corner portion of the rear portion.

The ECU 22 controls one camera 41 and the LiDAR sensors 42 and performs information processing of the detection results thereof. The ECU 23 controls another camera 41 and the radars 43 and performs information processing of the detection results thereof. The reliability of the detection results can be improved by providing two sets of apparatuses that detect the situation around the vehicle, and the environment around the vehicle can be multilaterally analyzed by providing different types of detection units such as cameras, LiDAR sensors and radars.

The ECU 24 controls a gyroscope sensor 5, a GPS sensor 24b and a communication apparatus 24c, and performs information processing of the detection results and communication results thereof. The gyroscope sensor 5 detects rotational movement of the vehicle 1. The course of the vehicle 1 can be determined by the detection results of the gyroscope sensor 5, wheel speed, and the like. The GPS sensor 24b detects the current position of the vehicle 1. The communication apparatus 24c wirelessly communicates with a server that provides map information and traffic information, and acquires the map and traffic information. The ECU 24 is capable of accessing a map information database 24a built in a storage device, and the ECU 24 performs processing such as searching for routes to a destination from the current position.

The ECU 25 is provided with a communication apparatus 25a for vehicle-to-vehicle communication. The communication apparatus 25a wirelessly communicates with other surrounding vehicles, and exchanges information therewith.

The ECU 26 controls a power plant 6. The power plant 6 is a mechanism that outputs a driving force for rotating the driving wheels of the vehicle 1, and includes an engine and a transmission, for example. The ECU 26 controls the output of the engine in correspondence with a driving operation (accelerator operation or acceleration operation) of the driver detected by an operation detection sensor 7a provided in an accelerator pedal 7A, and changes the gear ratio of the transmission based on information such as vehicle speed detected by a vehicle speed sensor 7c, for example. When the vehicle 1 is in the automated driving state, the ECU 26 automatically controls the power plant 6 in correspondence with instructions from the ECU 20, and controls acceleration and deceleration of the vehicle 1.

The ECU 27 controls lighting devices (headlights, taillights, etc.) including a direction indicator 8 (blinker). In the case of the example in FIG. 1, the direction indicator 8 is provided in the front portion, door mirrors and rear portion of the vehicle 1.

The ECU 28 controls an input-output apparatus 9. The input-output apparatus 9 outputs information to the driver and receives input of information from the driver. An audio output apparatus 91 alerts information to the driver by audio. A display apparatus 92 alerts information to the driver by image display. The display apparatus 92 is disposed in front of the driver's seat, and constitutes an instrument panel or the like. Note that, here, alerting of information by audio and display is illustrated, but information may also be alerted by vibration, light or other means. Also, information may be alerted by combining a plurality of these means, namely, audio, display, vibration and light. Furthermore, the combination may be changed or the alert mode may be changed, according to the level (e.g., urgency) of the information to be alerted. An input apparatus 93 is a switch group that is disposed in a position operable by the driver and gives instructions to the vehicle 1, but an audio input apparatus may also be included.

The ECU 29 controls a brake apparatus 10 and a parking brake (not shown). The brake apparatus 10 is a disc brake apparatus, is provided in each wheel of the vehicle 1, and decelerates or stops the vehicle 1 by applying resistance to the rotation of the wheels. The ECU 29 controls the operation of the brake apparatus 10 in correspondence with a driving operation (braking operation) of the driver detected by an operation detection sensor 7b provided in a brake pedal 7B, for example. When the vehicle 1 is in the automated driving state, the ECU 29 automatically controls the brake apparatus 10 in correspondence with instructions from the ECU 20, and controls deceleration and stopping of the vehicle 1. The brake apparatus 10 and the parking brake can also operate in order to maintain the stopped state of the vehicle 1. Also, in the case where the transmission of the power plant 6 is provided with a parking lock mechanism, the parking lock mechanism can also be operated in order to maintain the stopped state of the vehicle 1.

Acceleration/Deceleration Intervention Operation and Automatic Course Change Operation First, the relationship between the acceleration/deceleration intervention operation and the automatic course change control according to the present embodiment will be described, with reference to FIGS. 3A and 3B.

Figure 3A:
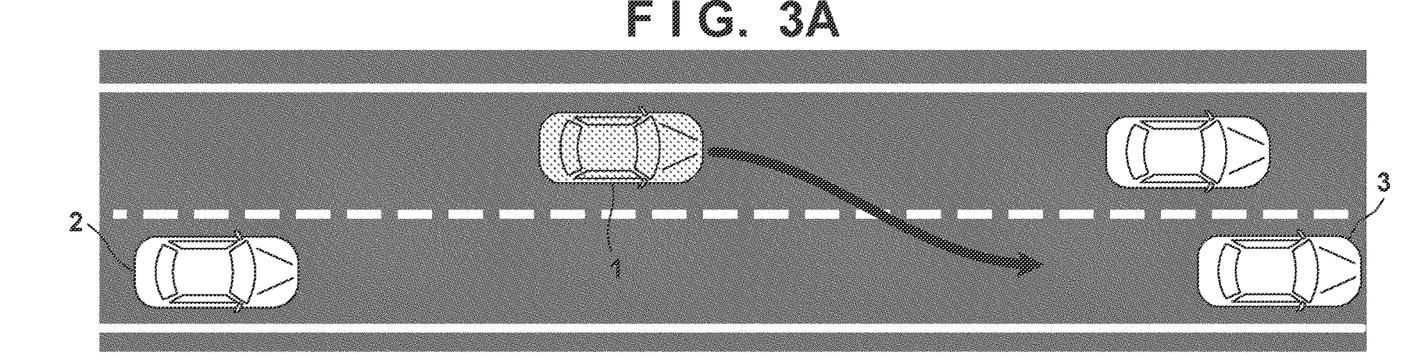
FIGS. 3A and 3B are diagrams of the relationship between an acceleration/deceleration intervention operation and automatic course change control according to the embodiment.

FIG. 3A is a diagram showing automatic course change (Automatic Lane Change: ALC) from the driving lane in which the vehicle 1 is currently traveling to an adjacent lane that is adjacent thereto. Here, the remaining time (predicted time) until a predetermined position of the vehicle 1 reaches (steps on) a separator line separating two lanes is defined as TTLC (Time To Line Crossing). The predetermined position can be set to the position of the front wheel of the vehicle 1 that is closest to the separator line, for example. Lane change control that differs according to whether the TTLC is greater than or equal to a predetermined value (e.g., 1.5 seconds) is performed. The TTLC can be calculated based on the vehicle speed in a vehicle width direction and the distance between the separator line and the wheel (right front wheel in the illustrated example) closest to the separator line, for example.

At the time of executing automatic course change, the ECU 20 may implement first guidance directed to the inside of the vehicle 1 and second guidance directed to the inside and outside of the vehicle 1 after the first guidance by instructing the ECU 28. Here, the first guidance is an alert sound or alert message (e.g., audio guidance "beep beep beep. Changing lanes now") for alerting that automatic course change will be executed, for example. Also, the second guidance is a blinking operation of the direction indicator 8 (blinker), for example.

Figure 3B:
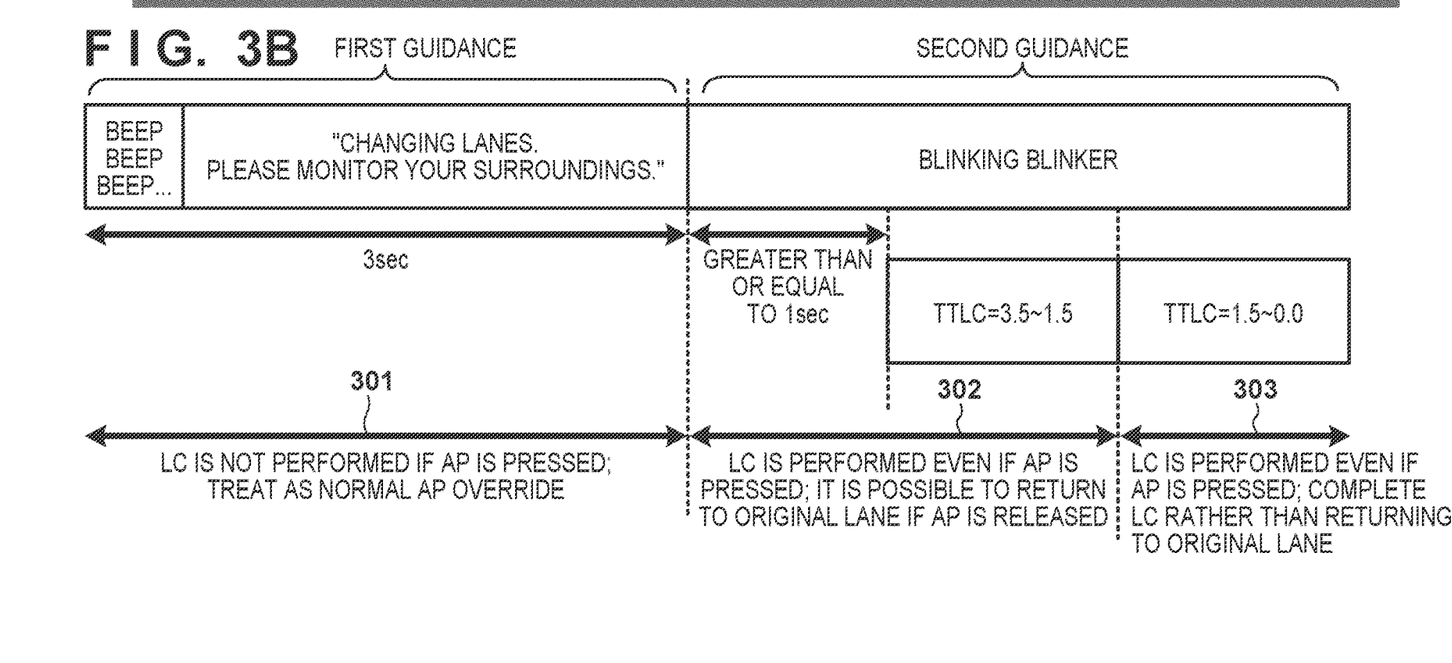

Specifically, as shown in FIG. 3B, as the first guidance, first the sound "beep beep beep . . . " is emitted when automatic lane change (ALC) is started, and thereafter the alert message "Changing lanes. Please monitor your surroundings" is emitted as audio guidance. The duration thereof is 3 seconds in the illustrated example, but may be other than 3 seconds. Thereafter, automatic lane change is implemented while causing the direction indicator 8 (blinker) to blink as the second guidance. If there is an acceleration/deceleration intervention operation (pressing down of the accelerator pedal 7A in the illustrated example) during this series of automatic lane change operations, different control is performed according to the timing of the intervention operation.

If the acceleration/deceleration intervention operation by the driver is detected after the second guidance (sections 302 and 303), execution of automatic course change is continued. Also, whether or not it is permissible to return to the original lane changes according to the TTLC.

Note that, in the case where the intervention operation is detected after the second guidance, the state of the vehicle 1 is transitioned from the second state in which holding of a steering apparatus of the vehicle 1 by the driver is not required and steering and acceleration/deceleration of the vehicle 1 is automatically controlled to the first state in which holding of the steering apparatus is required and steering and acceleration/deceleration of the vehicle 1 is automatically controlled. The driver can thereby be made to hold the steering apparatus at an early stage.

On the other hand, in the case where the acceleration/deceleration intervention operation by the driver is detected before the second guidance (section 301), execution of automatic course change is discontinued. In this way, in the case where the accelerator pedal 7A is operated by the driver during the period from the audio guidance for starting automatic course change to before operation of the direction indicator 8 (blinker), it becomes possible to perform vehicle control in line with the intention of the driver as much as possible by discontinuing the automatic course change operation. In that case, the direction indicator 8 (blinker) is controlled so as to not blink.

More specifically, the intervention operation, when performed in the section 301, is treated as a normal acceleration/deceleration intervention operation rather than performing automatic lane change, and acceleration/deceleration that depends on the acceleration/deceleration operation is performed in the current lane. For example, in the case where the accelerator pedal 7A is pressed in the section 301, rather than perform automatic lane change, the intervention operation is treated as normal override (pressing down) of the accelerator pedal 7A, and an acceleration operation that depends on the pressing down of the accelerator pedal 7A is performed.

Even if the intervention operation is performed in the section 302 (TTLC is a predetermined value (e.g., 1.5 seconds) or more), automatic lane change is still performed. If, however, the intervention operation is discontinued partway through during this period, control is performed that allows for discontinuing automatic lane change and returning to the original lane based on peripheral information. For example, in the case where a following vehicle 2 traveling in the lane to be changed to approaches the vehicle 1 or the vehicle 1 approaches a leading vehicle 3 traveling in the lane to be changed to, control is performed to enable the vehicle 1 to return to the original lane.

Even if the intervention operation is performed in the section 303 (TTLC is less than the predetermined value (e.g., 1.5 seconds)), automatic lane change is still performed. Even if the intervention operation is discontinued partway through during this period, automatic lane change is completed rather than returning to the original lane partway through the lane change.

In this way, control that changes between permitting return to the original lane according to the situation during automatic lane change or completing automatic lane change rather than returning to the original lane is performed, based on whether the TTLC is greater than or equal to a predetermined value. Adaptive control thereby becomes possible.

Note that although operation of the accelerator pedal 7A is given in the illustrated example, the same similarly applies with regard to operation of the brake pedal 7B.

Processing

Next, control related to automated driving of the vehicle 1 that is executed by the ECU 20 will be described. Upon a destination and automated driving being instructed by the driver, the ECU 20 automatically controls travel of the vehicle 1 toward the destination, in accordance with a guidance route found by the ECU 24. During automatic control, the ECU 20 acquires information relating to the situation around the vehicle 1 from the ECUs 22 and 23, and controls steering and/or acceleration/deceleration of the vehicle 1 by instructing the ECU 21 and the ECUs 26 and 29 based on the acquired peripheral information.

Figure 2:
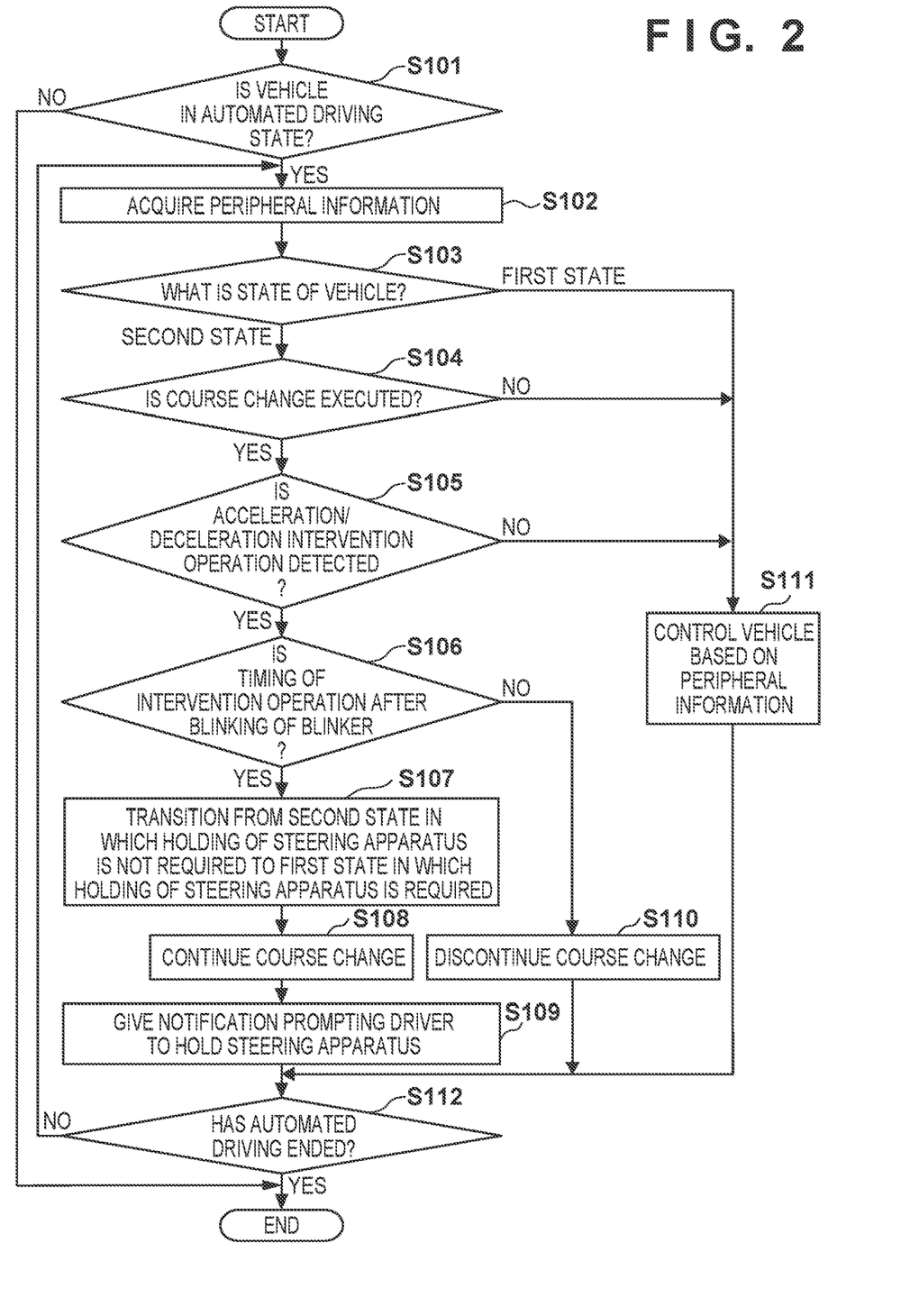
FIG. 2 is a flowchart showing an example of automated driving processing according to the embodiment.

FIG. 2 is a flowchart showing the procedure of processing that is implemented by the vehicle control apparatus according to the present embodiment. The processing contents of this flowchart are mainly performed by the ECU 20.

In step S101, the ECU 20 determines whether the vehicle 1 is in the automated driving state. If in the automated driving state, the ECU 20 advances to step S102. On the other hand, if not in the automated driving state, the ECU 20 ends this flowchart. In step S102, the ECU 20 acquires peripheral information of the vehicle 1 from the ECUs 22 and 23.

In step S103, the ECU 20 determines the control state of the vehicle 1. Specifically, the ECU 20 determines whether the state of the vehicle 1 is the first state in which holding of the steering apparatus (e.g., steering wheel 31) of the vehicle 1 by the driver is required and steering and acceleration/deceleration of the vehicle 1 is automatically controlled or the second state in which holding of the steering apparatus is not required and steering and acceleration/deceleration of the vehicle 1 is automatically controlled. If the second state, the ECU 20 advances to step S104. On the other hand, if the first state, the ECU 20 advances to step S111.

In step S104, the ECU 20 determines whether to execute automatic course change (e.g., lane change, right or left turn at intersection, etc.) based on the peripheral information of the vehicle 1. If executing automatic course change, the ECU 20 advances to step S105. On the other hand, if not executing automatic course change, the ECU 20 advances to step S111.

In step S105, the ECU 20 determines whether an acceleration/deceleration intervention operation by the driver was detected. Here, the acceleration/deceleration intervention operation is operation of the accelerator pedal 7A or the brake pedal 7B by the driver, for example. Operation of the accelerator pedal 7A is detected by the operation detection sensor 7a, and detection information is acquired from the ECU 26. Also, operation of the brake pedal 7B is detected by the operation detection sensor 7b, and detection information is acquired from the ECU 29. If an acceleration/deceleration intervention operation is detected, the ECU 20 advances to step S106. On the other hand, if an acceleration/deceleration intervention operation is not detected, the ECU 20 advances to step S111.

In step S106, the ECU 20 determines the timing at which the acceleration/deceleration intervention operation was detected. More specifically, the ECU 20 determines whether the intervention operation was detected after the second guidance described with reference to FIG. 3, that is, after blinking of the direction indicator 8 (blinker). If it is determined to be after blinking of the blinker, the ECU 20 advances to step S107. On the other hand, if it is determined to be before blinking of the blinker, the ECU 20 advances to step S110.

In step S107, the ECU 20 transitions the state of the vehicle 1 from the current second state in which holding of the steering apparatus (e.g., steering wheel 31) is not required to the first state in which holding of the steering apparatus is required.

In step S108, the ECU 20 continues course change.

Because the state of the vehicle 1 has transitioned to the first state, the ECU 20, in step S109, gives notification that prompts the driver to hold the steering apparatus by instructing the ECU 28.

In step S110, the ECU 20 does not transition the state of the vehicle 1 from the current second state in which holding of the steering apparatus is not required to the first state in which holding of the steering apparatus is required, and discontinues course change. A configuration may, however, be adopted in which course change is resumed, in the case where the driver holding the steering apparatus is detected after discontinuing course change.

In step S111, the ECU 20 controls the vehicle 1 based on the peripheral information acquired in step S102. For example, in the case of advancing from step S103 to step S111, holding of the steering apparatus is already required, and thus automated driving is directly continued in the case of performing automatic course change. Note that in the case where the acceleration/deceleration intervention operation is detected in this state, the ECU 20 continues automated driving while performing vehicle speed control that depends on the intervention operation. Also, if No in step S104, the ECU 20 does not execute automatic course change, and continues automated driving control in the current driving lane. If No in step S105, automatic course change is executed, but because there is no acceleration/deceleration intervention operation, control for completing automatic course change is directly performed.

In step S112, the ECU 20 determines whether the automated driving state of the vehicle 1 has ended. If not ended, the ECU 20 returns to step S102 and continues the series of processing. Note that the series of processing is repeatedly performed in around 10 [msec] or a shorter period. On the other hand, if ended, the ECU 20 ends the series of processing.

Note that the steps of this flowchart may be changed within the spirit of the present invention, and, for example, the order of the steps may be changed, some steps may be omitted, or other steps may be added.

As described above, in the present embodiment, if input of the acceleration/deceleration intervention operation by the driver is detected in the case of executing course change of the vehicle, when the vehicle is travelling in a state in which holding of the steering apparatus is not required, the state of the vehicle is transitioned to a state in which holding of the steering apparatus is required according to the detection timing.

Even in the case where an acceleration/deceleration intervention operation is performed, it thereby becomes possible to continue lane change control in line with the intention of the driver, while taking safety into consideration.

Also, by transitioning the state of the vehicle to a state in which holding of the steering apparatus is required, and giving notification that prompts holding of the steering apparatus, the steering apparatus can be quickly held. Thus, because the steering apparatus will be held in the case where an acceleration/deceleration intervention operation is performed, it becomes possible for the driver to respond flexibly, and safety can be further improved.

Variations

The above embodiment describes an example in which, if input of an acceleration/deceleration intervention operation by the driver is detected in the case of executing course change of the vehicle, when the vehicle is traveling in the state in which holding of the steering apparatus is not required, the state of the vehicle is transitioned to a state in which holding of the steering apparatus is required. However, whether or not to perform state transition may be branched, according to the extent of the acceleration/deceleration intervention operation.

For example, the ECU 20 may be configured to transition the state of the vehicle to a state in which holding of the steering apparatus is required, in the case where it is detected that the acceleration/deceleration intervention operation is greater than or equal to a predetermined amount (e.g., the accelerator pedal 7A or the brake pedal 7B is pressed down by an amount is greater than or equal to a predetermined amount). Alternatively, the ECU 20 may be configured to transition the state of the vehicle to a state in which holding of the steering apparatus is required, in the case where it is detected that the speed change of the vehicle 1 due to the acceleration/deceleration intervention operation is greater than or equal to a predetermined amount.

In cases such as where an erroneous intervention operation not originally intended by the driver is performed (e.g., case such as where the accelerator pedal 7A or the brake pedal 7B is touched unintentionally), state transition being executed unnecessarily can be inhibited.

Also, the above embodiment describes an example in which notification that prompts holding of the steering apparatus is given in step S109, after performing state transition in step S107. In this case, transitioning again to the state in which holding of the steering apparatus is not required may be prohibited until a predetermined distance has been traveled or until a predetermined time has elapsed after transition to the state in which holding of the steering apparatus is required. The control state of vehicle frequently transitioning in a transitional operating state can thereby be inhibited.

Also, the above embodiment describes an example in which notification that prompts holding of the steering apparatus is given to the driver in step S109 after state transition, but there are cases where the steering apparatus is not held despite a predetermined time having elapsed since the notification. Accordingly, in such cases, a second notification with a higher notification strength than the initial notification may be given to again prompt holding of the steering apparatus. The notification strength being high means that audio for notification is set to a higher volume than the first notification, or the contents of the message are made more urgent. For example, messages may be configured such that the initial message is "Please hold the steering apparatus", and the second message is "Please take hold of the steering apparatus immediately."

At this time, the length of the predetermined time may be changed, according to whether course change is being executed. For example, the predetermined time may be set as a first time, in the case of having transitioned from the second state in which holding of the steering apparatus of the vehicle 1 by the driver is not required and steering and acceleration/deceleration of the vehicle 1 is automatically controlled to the first state in which holding of the steering apparatus is required and steering and acceleration/deceleration of the vehicle 1 is automatically controlled, when course change is not being executed (before starting course change). Also, the predetermined time may be set as a second time shorter than the first time, in the case of having transitioned from the second state to the first state during executing of course change. In the case where course change is already being executed, it thereby becomes possible to prompt holding of the steering apparatus at an early stage.

Also, a configuration may be adopted in which, in the case where the operation amount per unit time of the intervention operation for acceleration/deceleration (operation of the accelerator pedal 7A or the brake pedal 7B) is greater than or equal to a predetermined value, notification (initial notification) that prompts holding of the steering apparatus is given earlier than in the case where the operation amount per unit time is less than the predetermined value. That is, if the accelerator pedal 7A or the brake pedal 7B is pressed down suddenly, the driver may be prompted to quickly take hold of the steering apparatus in the case of having transitioned from the second state to the first state. It thereby becomes possible to improve safety.

Also, the way of reflecting the intervention operation for acceleration/deceleration (operation of the accelerator pedal 7A or the brake pedal 7B) may be changed, according to whether the steering apparatus is being held. For example, in the case where the steering apparatus is not being held, the acceleration/deceleration input due to the intervention operation may be reflect within a predetermined vehicle speed range. On the other hand, in the case where the steering apparatus is being held, the acceleration/deceleration input by the intervention operation may be reflected beyond the predetermined vehicle speed range. The predetermined vehicle speed range is 70 km/h to 135 km/h, for example, but may be set to other vehicle speed ranges. Since it is thereby possible to avoid operation of the accelerator pedal 7A or the brake pedal 7B being entirely reflected in the acceleration/deceleration in a situation where the steering apparatus is not being held, safety can be improved.

Also, the above embodiment describes an example in which different control is performed according to the detection timing of the intervention operation by the driver, but the present invention is not limited to this example. A configuration may be adopted in which, if input of the acceleration/deceleration intervention operation by the driver is detected in the case of executing course change of the vehicle, when the vehicle is traveling in a state in which holding of the steering apparatus is not required, the state of the vehicle is transitioned to a state in which holding of the steering apparatus is required, regardless of the detection timing.

According to the present invention, by transitioning to a state in which holding of the steering apparatus is required, it becomes possible to implement vehicle control that takes safety into consideration, even in the case where an acceleration/deceleration intervention operation is performed.

Additional Matters

Also, a program that realizes one or more of the functions described in the embodiments is supplied to a system or apparatus via a network or a storage medium, and the one or more processors in a computer of the system or apparatus are able to read out and execute this program. The present invention is also realizable by such a mode.

The invention is not limited to the foregoing embodiments, and various variations/changes are possible within the spirit of the invention.

SUMMARY OF THE EMBODIMENTS

A vehicle control apparatus (e.g., 2) according to a first mode is a vehicle control apparatus for controlling a vehicle (e.g., 1) based on peripheral information of the vehicle, the apparatus including:

a control unit (e.g., 20) configured to control steering and acceleration/deceleration of the vehicle in a first state in which holding of a steering apparatus (e.g., 31) of the vehicle by a driver is required or a second state in which holding of the steering apparatus is not required, the control unit transitioning a state of the vehicle from the second state to the first state, if input of an intervention operation for acceleration/deceleration by the driver is detected in a case of executing course change of the vehicle, when the vehicle is traveling in the second state (e.g., step S107).

According to the first mode, by transitioning to a state in which holding of the steering apparatus is required, it becomes possible to implement vehicle control that takes safety into consideration, even in the case where an acceleration/deceleration intervention operation is performed.

In the vehicle control apparatus (e.g., 2) according to a second mode, the control unit, at a time of executing the course change, implements first guidance directed to inside of the vehicle and second guidance (e.g., 8) directed to inside and outside of the vehicle after the first guidance, and the control unit in a case where input of the intervention operation by the driver is detected after the second guidance (e.g., 302, 303), transitions the state of the vehicle from the second state to the first state, and continues the course change, and in a case where input of the intervention operation by the driver is detected before the second guidance (e.g., 301), does not transition the state of the vehicle from the second state to the first state, and discontinues execution of the course change.

According to the second mode, different vehicle control is executed according to the timing of the acceleration/deceleration intervention operation, thus enabling vehicle control more in line with the intention of the driver to be realized.

In the vehicle control apparatus (e.g., 2) according to a third mode, the control unit transitions the state of the vehicle from the second state to the first state, in a case where it is detected that the intervention operation is greater than or equal to a predetermined amount or where a speed change due to the intervention operation is greater than or equal to a predetermined amount.

According to the third mode, in the case where the acceleration/deceleration intervention operation is large or in cases such as where the speed of the vehicle increases following the intervention operation, the state of the vehicle can be transitioned to a state in which holding of the steering apparatus by the driver is required, thus facilitating calling of the driver's attention.

In the vehicle control apparatus (e.g., 2) according to a fourth mode, the control unit, after transition from the second state to the first state, prohibits transition to the second state until a predetermined distance is traveled or until a predetermined time has elapsed.

According to the fourth mode, it becomes possible to prohibit state transition in a transitional operating state.

The vehicle control apparatus (e.g., 2) according to a fifth mode further includes:

a notification unit (e.g., step S109) configured to give a first notification that prompts holding of the steering apparatus in the case of having transitioned from the second state to the first state.

According to the fifth mode, the driver can be prompted to quickly hold the steering apparatus.

In the vehicle control apparatus (e.g., 2) according to a sixth mode, the notification unit, in a case where the driver is not holding the steering apparatus, gives a second notification that prompts holding of the steering apparatus with a higher notification strength than the first notification.

According to the sixth mode, in the case where the driver does not hold the steering apparatus even when there is an initial notification, it becomes possible to again prompt holding of the steering apparatus with increased urgency.

In the vehicle control apparatus (e.g., 2) according to a seventh mode, the notification unit, in a case where the driver is not holding the steering apparatus even after a predetermined time has elapsed since the first notification, gives a second notification that prompts holding of the steering apparatus with a higher notification strength than the first notification, before starting the course change, the predetermined time is a first time, and during execution of the course change, the predetermined time is a second time shorter than the first time.

According to the seventh mode, in the case where state transition occurs during execution of course change, it becomes possible to prompt holding of the steering apparatus earlier and with increased urgency.

In the vehicle control apparatus (e.g., 2) according to an eighth mode, the notification unit, in a case where an operation amount per unit time of the intervention operation for acceleration/deceleration is greater than or equal to a predetermined value, performs the first notification earlier than the case where the operation amount per unit time is less than the predetermined value.

According to the eighth mode, in the case where a sudden acceleration/deceleration intervention operation is performed, it becomes possible to prompt holding of the steering apparatus at an early stage.

In the vehicle control apparatus (e.g., 2) according to a ninth mode, the control unit in a case where the steering apparatus is not being held, reflects the acceleration/deceleration input due to the intervention operation within a predetermined vehicle speed range, and in a case where the steering apparatus is being held, reflects the acceleration/deceleration input due to the intervention operation beyond the predetermined vehicle speed range.

According to the ninth mode, it becomes possible to prevent the vehicle from reaching high speed in the state where the steering apparatus is not being held.

In the vehicle control apparatus (e.g., 2) according to a tenth mode, the control unit controls continuation or discontinuation of the course change of the vehicle, based on an amount of progress of the course change, in a case where the intervention operation changes from an ON state to an OFF state after starting the second guidance.

According to the tenth mode, it becomes possible to adaptively control whether to continue or discontinue course change of the vehicle, according to an amount of progress of the course change.

In the vehicle control apparatus (e.g., 2) according to an eleventh mode, the control unit controls continuation or discontinuation of the course change, based on an operation amount of the intervention operation after starting the second guidance.

According to the eleventh mode, it is possible to adaptively control whether to continue or discontinue course change, according to the operation amount of the intervention operation (e.g., the amount by which the accelerator pedal 7A or the brake pedal 7B is pressed down).

A vehicle (e.g., 1) according to a twelfth mode includes the vehicle control apparatus according to any of the first to eleventh modes.

According to the twelfth mode, it becomes possible to continue lane change control in line with the intention of the driver, while taking safety into consideration, even in the case where an acceleration/deceleration intervention operation is performed, thus enabling safer automated driving to be realized with vehicles.

An operating method of a vehicle control apparatus (e.g., 2) according to a thirteenth mode is an operating method of a vehicle control apparatus that controls a vehicle (e.g., 1) based on peripheral information of the vehicle, the method including:

controlling steering and acceleration/deceleration of the vehicle in a first state in which holding of a steering apparatus (e.g., 31) of the vehicle by a driver is required or a second state in which holding of the steering apparatus is not required, in the controlling, a state of the vehicle is transitioned from the second state to the first state, if input of an intervention operation for acceleration/deceleration by the driver is detected in a case of executing course change of the vehicle, when the vehicle is traveling in the second state (e.g., step S107).

According to the thirteenth mode, by transitioning to a state in which holding of the steering apparatus is required, it becomes possible to implement vehicle control that takes safety into consideration, even in the case where an acceleration/deceleration intervention operation is performed.

A program according to a fourteenth mode is a program for causing a computer to operate as the vehicle control apparatus according to any of the first to eleventh modes.

According to the fourteenth mode, the operations of the vehicle control apparatus of any of the first to eleventh mode can be realized by a computer.

What is claimed is:

1. A vehicle control apparatus for controlling a vehicle based on peripheral information of the vehicle, the apparatus comprising:
a control unit configured to automatically control, by a judgment of the vehicle control apparatus, steering and acceleration/deceleration of the vehicle in a first state in which holding of a steering apparatus of the vehicle by a driver is required or a second state in which holding of the steering apparatus is not required,
wherein the control unit transitions a state of the vehicle from the second state to the first state and continues a course change, if input of an intervention operation for acceleration/deceleration by the driver is detected after a guidance to an outside of the vehicle for the course change of the vehicle, when the vehicle is traveling in the second state.

2. The vehicle control apparatus according to claim 1,
wherein the control unit, at a time of executing the course change, implements first guidance directed to inside of the vehicle and second guidance directed to inside and outside of the vehicle after the first guidance, and
the control unit
in a case where input of the intervention operation by the driver is detected after the second guidance, transitions the state of the vehicle from the second state to the first state, and continues the course change, and
in a case where input of the intervention operation by the driver is detected before the second guidance, does not transition the state of the vehicle from the second state to the first state, and discontinues execution of the course change.

3. The vehicle control apparatus according to claim 2,
wherein the control unit controls continuation or discontinuation of the course change of the vehicle based on an amount of progress of the course change, in a case where the intervention operation changes from an ON state to an OFF state after starting the second guidance.

4. The vehicle control apparatus according to claim 2,
wherein the control unit controls continuation or discontinuation of the course change, based on an operation amount of the intervention operation after starting the second guidance.

5. The vehicle control apparatus according to claim 1,
wherein the control unit transitions the state of the vehicle from the second state to the first state, in a case where it is detected that the intervention operation is greater than or equal to a predetermined amount or where a speed change due to the intervention operation is greater than or equal to a predetermined amount.

6. The vehicle control apparatus according to claim 1,
wherein the control unit, after transition from the second state to the first state, prohibits transition to the second state until a predetermined distance is traveled or until a predetermined time has elapsed.

7. The vehicle control apparatus according to claim 1 further comprising:
a notification unit configured to give a first notification that prompts operating or holding of the steering apparatus in the case of transitioning from the second state to the first state.

8. The vehicle control apparatus according to claim 7,
wherein the notification unit, in a case where the driver is not operating or holding the steering apparatus, gives a second notification that prompts operating or holding of the steering apparatus with a higher notification strength than the first notification.

9. The vehicle control apparatus according to claim 7,
wherein the notification unit, in a case where the driver is not holding the steering apparatus even after a predetermined time has elapsed since the first notification, gives a second notification that prompts holding of the steering apparatus with a higher notification strength than the first notification,
before starting the course change, the predetermined time is a first time, and
during execution of the course change, the predetermined time is a second time shorter than the first time.

10. The vehicle control apparatus according to claim 7,
wherein the notification unit, in a case where an operation amount per unit time of the intervention operation for acceleration/deceleration is greater than or equal to a predetermined value, performs the first notification earlier than a case where the operation amount per unit time is less than the predetermined value.

11. The vehicle control apparatus according to claim 1,
wherein the control unit
in a case where the steering apparatus is not being held, reflects the acceleration/deceleration input due to the intervention operation within a predetermined vehicle speed range, and
in a case where the steering apparatus is being held, reflects the acceleration/deceleration input due to the intervention operation beyond the predetermined vehicle speed range.

12. An operating method of a vehicle control apparatus that controls a vehicle based on peripheral information of the vehicle, the method including:
automatically controlling, by a judgment of the vehicle control apparatus, steering and acceleration/deceleration of the vehicle in a first state in which holding of a steering apparatus of the vehicle by a driver is required or a second state in which holding of the steering apparatus is not required,
in the controlling, a state of the vehicle is transitioned from the second state to the first state and a course change is continued, if input of an intervention operation for acceleration/deceleration by the driver is detected after a guidance to an outside of the vehicle for the course change of the vehicle, when the vehicle is traveling in the second state.

13. A non-transitory computer-readable storage medium storing a program for causing a computer to operate as the vehicle control apparatus according to claim 1.

14. A vehicle comprising the vehicle control apparatus according to claim 1.

* * * * *